US008806558B1

United States Patent
Cassidy et al.

(10) Patent No.: US 8,806,558 B1
(45) Date of Patent: Aug. 12, 2014

(54) UNIQUE WATERMARKING OF CONTENT OBJECTS ACCORDING TO END USER IDENTITY

(71) Applicant: Limelight Networks, Inc., Tempe, AZ (US)

(72) Inventors: Sean Cassidy, Seattle, WA (US); Brandon Smith, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/133,478

(22) Filed: Dec. 18, 2013

Related U.S. Application Data

(60) Provisional application No. 61/880,682, filed on Sep. 20, 2013.

(51) Int. Cl.
*H04N 7/173* (2011.01)
*G06K 9/36* (2006.01)
*G06K 9/46* (2006.01)
*H04L 9/32* (2006.01)
*G06F 17/30* (2006.01)
*H04N 7/16* (2011.01)
*G06F 7/04* (2006.01)

(52) U.S. Cl.
USPC ........... 725/118; 725/116; 382/235; 382/236; 382/239; 713/176; 726/28; 726/30

(58) Field of Classification Search
USPC .................. 725/116, 118, 119; 382/100, 232; 713/176
See application file for complete search history.

(56) References Cited

U.S. PATENT DOCUMENTS

| 6,735,699 | B1 | 5/2004 | Sasaki et al. | |
|---|---|---|---|---|
| 6,993,137 | B2 | 1/2006 | Fransdonk | |
| 7,185,200 | B1 * | 2/2007 | Levine et al. | 713/176 |
| 7,328,345 | B2 | 2/2008 | Morten et al. | |
| 7,461,255 | B2 * | 12/2008 | Iwamura | 713/176 |
| 7,552,338 | B1 | 6/2009 | Swildens et al. | |
| 7,630,511 | B2 * | 12/2009 | Zhao et al. | 382/100 |
| 7,802,095 | B2 | 9/2010 | Risan et al. | |
| 7,853,124 | B2 * | 12/2010 | Ramaswamy et al. | 386/239 |
| 7,882,357 | B1 * | 2/2011 | Johnston et al. | 713/176 |

(Continued)

OTHER PUBLICATIONS

Judge, Paul Q, "Security and Protection Architectures for Large-Scale Content Distribution", Retrieved on Jan. 10, 2014 from https://smartech.gatech.edu/bitstream/handle/1853/9217/judge_paul_q_200212_phd_662596.pdf?sequence=1, Oct. 2002, 178 pages, Georgia Institute of Technology.

*Primary Examiner* — Mushfikh Alam
(74) *Attorney, Agent, or Firm* — Kilpatrick Townsend & Stockton LLP

(57) ABSTRACT

A machine-implementable method for uniquely watermarking a content object according to end user identity includes transcoding an original content object to a format that is compatible with end user systems, and storing the transcoded content object where it is accessible by one or more points of presence (POPs) of a content delivery network. One of the POPs receives identifying information associated with a specific one of the end user systems. A digital watermark engine adds uncorrected digital watermark information correlating to the end user system, to the content object, to form a uniquely watermarked content object. The uncorrected digital watermark information is correctable by error correction capability of the specific end user system to deliver a version of the content object that is indistinguishable by a human from the original content object. The method further includes transmitting the uniquely watermarked content object to the specific end user system.

20 Claims, 5 Drawing Sheets

(56) References Cited

U.S. PATENT DOCUMENTS

| | | |
|---|---|---|
| 7,992,003 B2 * | 8/2011 | Rhoads .................. 713/176 |
| 8,200,958 B2 | 6/2012 | Coppola et al. |
| 2001/0019618 A1 * | 9/2001 | Rhoads .................. 382/100 |
| 2001/0051996 A1 | 12/2001 | Cooper et al. |
| 2002/0181738 A1 * | 12/2002 | Nakamura et al. ......... 382/100 |
| 2003/0091336 A1 * | 5/2003 | Gobert ..................... 386/94 |
| 2004/0022444 A1 * | 2/2004 | Rhoads .................. 382/232 |
| 2005/0078944 A1 | 4/2005 | Risan et al. |
| 2005/0141747 A1 * | 6/2005 | Shi et al. ................. 382/100 |
| 2005/0193205 A1 | 9/2005 | Jacobs et al. |
| 2006/0072750 A1 * | 4/2006 | Steenhof et al. ............ 380/201 |
| 2006/0204030 A1 * | 9/2006 | Kogure et al. ............. 382/100 |
| 2007/0253592 A1 * | 11/2007 | Sun et al. ................. 382/100 |
| 2008/0133927 A1 * | 6/2008 | Moskowitz et al. ......... 713/176 |
| 2008/0307227 A1 * | 12/2008 | Huang et al. ............... 713/176 |
| 2009/0037388 A1 * | 2/2009 | Cooper et al. ............... 707/3 |
| 2010/0122349 A1 * | 5/2010 | LeVine et al. ................ 726/27 |
| 2010/0146286 A1 * | 6/2010 | Petrovic et al. ............. 713/176 |
| 2011/0004897 A1 * | 1/2011 | Alexander et al. ............ 725/32 |
| 2011/0010555 A1 * | 1/2011 | Moskowitz et al. .......... 713/176 |
| 2012/0004958 A1 | 1/2012 | Bloom et al. |
| 2012/0163653 A1 * | 6/2012 | Anan et al. ................. 382/100 |
| 2012/0203561 A1 * | 8/2012 | Villette et al. ............... 704/500 |
| 2013/0111213 A1 * | 5/2013 | Chen et al. ................. 713/176 |
| 2013/0114744 A1 | 5/2013 | Mutton |
| 2013/0308699 A1 | 11/2013 | Musser et al. |
| 2013/0343450 A1 | 12/2013 | Solka et al. |

* cited by examiner

UNIQUE WATERMARKING OF CONTENT OBJECTS ACCORDING TO END USER IDENTITY

CROSS REFERENCE TO RELATED APPLICATIONS

This application is a non-provisional application of, and claims priority to, U.S. Provisional Patent Application Ser. No. 61/880,682, filed 20 Sep. 2013 and incorporated by reference in its entirety herein for all purposes.

BACKGROUND

Unauthorized use of video content, such as rebroadcast thereof, is undesirable from the point of view of video content providers, who may not be compensated for the unauthorized use. Existing methods for preventing or detecting unauthorized use include attaching metadata to video files, and protocols that add material to or around edges of video frames. Such methods may sometimes be circumvented by removing the metadata or cropping the video.

SUMMARY

In an embodiment, a machine-implementable method for uniquely watermarking a content object according to end user identity includes transcoding an original content object to form a transcoded content object having a format that is compatible with transmission to an end user system and display by the end user system to an end user, storing the transcoded content object in a storage medium that is accessible by one or more points of presence (POPs) of a content delivery network, and receiving, at one of the one or more POPs of the content delivery network, a first request and a second request for the transcoded content object request from first and second end user systems respectively. The first request for the transcoded content object conveys first identifying information that is associated with at least one of identity of the first end user system, and identity of a first end user of the first end user system. The second request for the transcoded content object conveys second identifying information that is associated with at least one of identity of the second end user system, and identity of a second end user of the second end user system. First and second uncorrected digital watermark information is added to the transcoded content object to form respective first and second uniquely watermarked content objects. The first and the second uncorrected digital watermark information are different from one another, and correspond to the first and second identifying information respectively. Both the first and the second uncorrected digital watermark information are correctable by error correction capability of the respective end user systems such that the respective first and second end user systems display content that is indistinguishable by the first and second end users from the transcoded content object. The first and second uniquely watermarked content objects are transmitted to the first and second end user systems respectively.

In an embodiment, a machine-implementable method for uniquely watermarking a content object according to end user identity includes transcoding an original content object to form a transcoded content object having a format that is compatible with transmission to any of a plurality of end user systems, storing the transcoded content object in a database that is accessible by one or more points of presence (POPs) of a content delivery network, and receiving identifying information associated with a content object request from a specific one of the end user systems at one of the one or more POPs of the content delivery network. The method further includes utilizing a digital watermark engine of one of the one or more POPs of the content delivery network to add uncorrected digital watermark information to the content object to form a uniquely watermarked content object. The uncorrected digital watermark information correlates to the identifying information of the specific one of the end user systems, and the uncorrected digital watermark information is correctable by error correction capability of the specific one of the end user systems to deliver a version of the content object that is indistinguishable by a human from the original content object. The method further includes transmitting the uniquely watermarked content object to the specific one of the end user systems.

Further areas of applicability of the present disclosure will become apparent from the detailed description provided hereinafter. It should be understood that the detailed description and specific examples below, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiments only, and is not intended to limit the scope, applicability or configuration of the disclosure. Rather, the description will provide those skilled in the art with an enabling description for implementing embodiments. It is understood that various changes may be made in the function and arrangement of elements without departing from the spirit and scope as set forth in the appended claims.

Figure 1:
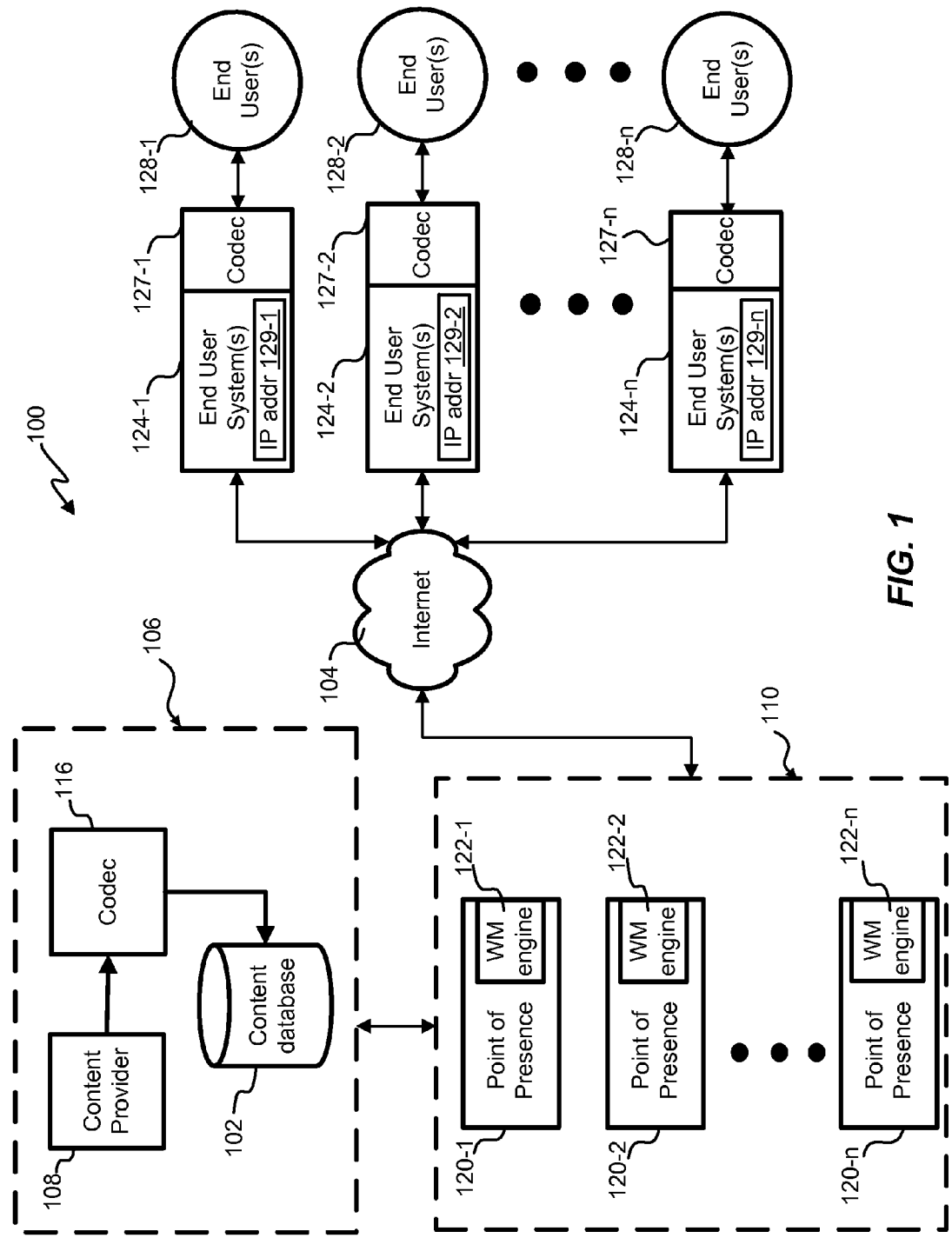
FIG. 1 schematically illustrates a system configured for unique watermarking of video content according to consumer identity, according to an embodiment.

FIG. 1 schematically shows a system 100 configured for unique watermarking of video content according to consumer identity. In the embodiment of FIG. 1, video content is provided from a content originator 106 and distributed to end user systems 124-(1 through n) of respective users 128-(1 through n), through the Internet 104 and a content delivery network (CDN) 110. Certain connections among components of content originator 106, CDN 110 are omitted in FIG. 1 for clarity of illustration. Although the present digital watermarking techniques are illustrated within the context of a content delivery system, it will be apparent upon reading and understanding the present disclosure that the techniques herein may be adapted to other systems that distribute content to users that could undesirably retain, copy, retransmit or rebroadcast the content.

Within content originator 106, a content provider 108 provides content objects, for example video files such as raw video footage, movies, commercials and the like, or audio files. The content objects may be transcoded into a variety of file types that are optimized for different purposes. For example, certain formats are optimized to minimize memory space, while others are optimized for transmission according to various formats and/or transmission bitrates. Possible initial and/or desired post-transcoding formats include MOV, M2TS, MXF, OGM, RMVB, RM, WMV, QT, WebM, FLV, MOD, TS, TP, DVR-MS, Divx, AVI, WMV, MP4, MPEG-1, MPEG-2, FLV, SWF, MKV, 3GP, 3G2, AVCHD (*.M2TS, *.MTS, *.TOD), HD MKV, HD H.264/MPEG-4 AVC, HD MPEG-2, HD MPEG Transport Stream (*.TS, *.TP, *.M2T), MP3, Flac, WMA, M4A, OGG, WAVE, AAC and others.

System 100 illustrates transcoding of the content objects for transmission by a codec 116 that may include error correction capability, for example codec 116 may both detect and correct bit errors in the original file during the transcoding. Also, the act of transcoding itself may include generating error correction content such as parity bits, checksums and the like. The depiction of a single content provider 108, codec 116 and content database 102 in content originator 106 is exemplary only; for example there may be any number of content providers 108 associated with content originator 106, there may be multiple codecs 116 or no codec 116, and there may be multiple content databases 102 or no content database 102.

When content originator 106 does not include a codec 116 and/or content database 102, their functions are supported within CDN 110. Transcoding may be done while copies of the original content object are being prepared for storage in content database 102, as shown, or could be handled by a codec 116 within CDN 110. Transcoding can be done on demand (that is, upon receipt of a request for a given content object) but is advantageously done before requests are received, and to a variety of formats, so that copies are ready to stream out immediately upon demand from users, in whatever format is required for transmission to end user systems 124. Each end user 128 accesses content using one such end user system 124 having an Internet Protocol (IP) address 129. End user systems 124 typically also use a codec 127, for example a video driver, to transcode content objects from a format used by end user system 124 to another format as needed to successfully display the content objects to users 128, for example by displaying the content objects on a monitor.

CDN 110 includes a plurality of points of presence (POPs) 120-(1 through n), typically deployed in differing geographic regions to quickly serve content to end users 128. (The number n indicates only an arbitrary number of POPs, not necessarily an equal number to the end user systems 124 and end users 128 described above.) Each POP 120 typically includes edge servers (so called because the POPs are at the "edge" of the network, that is, closest to the end users). POPs 120 may also include storage that hosts copies of content for ready distribution, as now described in connection with FIG. 2.

Figure 2:
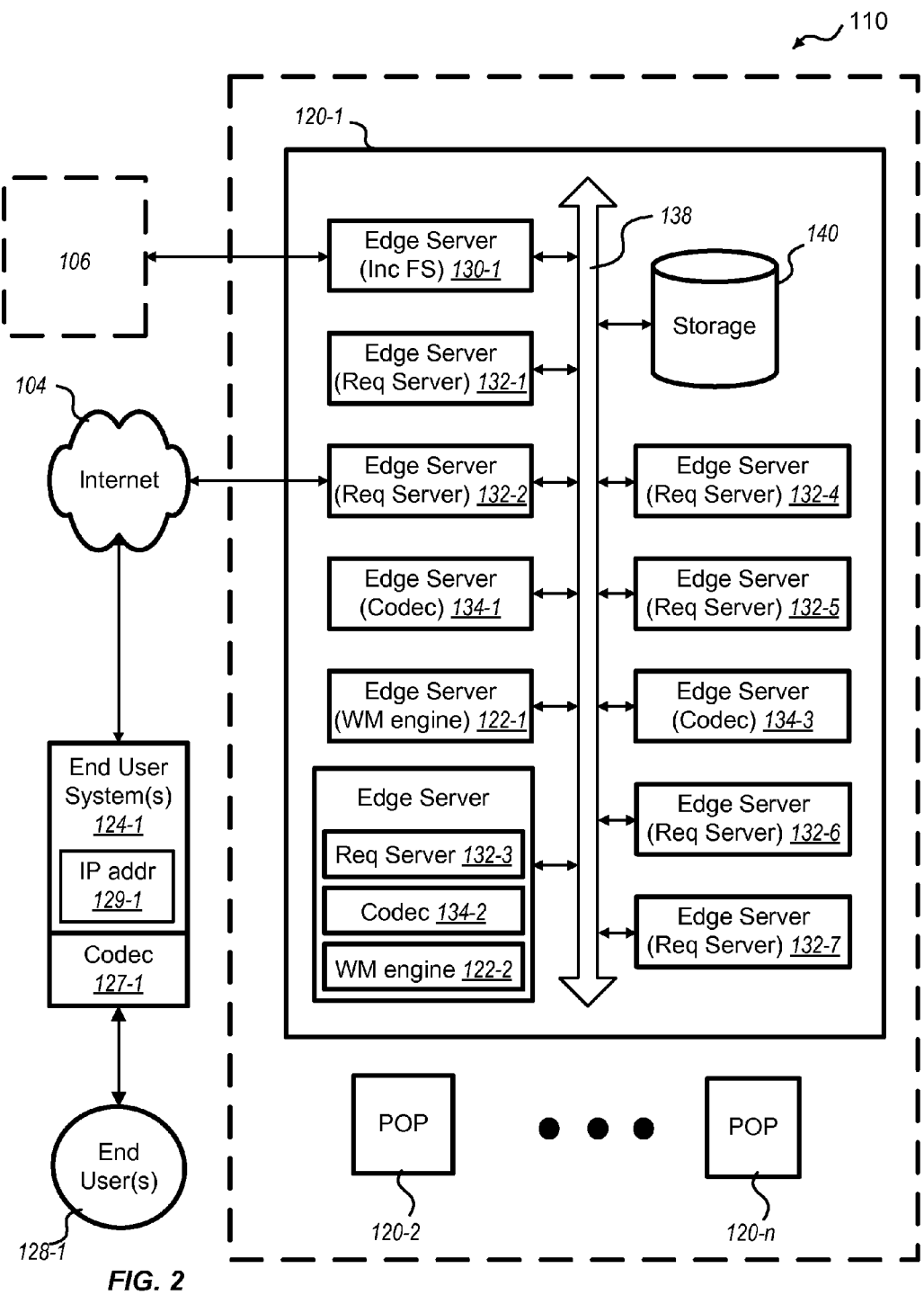
FIG. 2 schematically illustrates the system of FIG. 1 including details of a point of presence (POP) thereof, according to an embodiment.

FIG. 2 schematically illustrates system 100, including exemplary details of point of presence (POP) 120-1, according to an embodiment. POP 120-1 includes multiple edge servers that support intake and transcoding of content objects, receive requests from end users for the content objects, digitally watermark content objects, forward content objects to the requesting end users, perform financial accounting for serving the content objects, and other support functions for the CDN. The edge servers may be configurable through software to serve a variety of purposes. For example, in POP 120-1, one edge server is configured as an incoming file server 130-1, seven edge servers are configured as request servers 132-(1 through 7), three edge servers are configured as codecs 134-(1 through 3), and one edge server is configured as watermark engine 122-1, as shown in FIG. 1. The designation of most of the edge servers in FIG. 2 as supporting only one particular function is for clarity of illustration only; in embodiments, a given edge server may be configured through software to support more than one of the incoming file server, codec, request server, watermark engine and/or other functions. In particular, a single edge server may be configured to perform any or all of the request server, codec and watermark engine functions as needed relative to a single content object, in response to a request for the content object, such as the edge server shown that acts as request server 132-3, codec 134-2 and watermark engine 122-2. POP 120-1 also includes a storage capability 140 for incoming files, transcoded files, software, accounting data and any other data for which storage is required. Edge servers, storage 140 and/or any other components of POP 120-1 communicate with one another; in FIG. 2 such communication is shown as taking place over a local area network (LAN) 138, but other forms of communication among components of POP 1120-1 may be utilized. Also, although exemplary connections are shown between content originator 106 and incoming file server 130-1, and between internet 104 and request server 132-2, it is understood that such connections are typically arranged in software, based on a domain name server (not shown) determining which edge server is designated as corresponding to a given domain name request from content originator 106 or end user system 124-1. CDN 110 also includes other POPs 120, of which only POP 120-2 and POP 120-n are shown in FIG. 2, for clarity of illustration.

Referring now as needed to FIG. 1 and/or FIG. 2, CDN 110 serves content object requests from end users 128 with content from one or more content originators 106. Content object(s) may be retrieved from content database 102 for each such request, or copies of the content object(s) may be stored within POPs 120 of CDN 110, for rapid delivery. Each of the end user requests includes identifying information for security and accounting purposes. For example, a given end user 128 may request content from a website in return for compensation from the content originator 106 that provides the content. Compensation transactions may include recognizing an end user system as corresponding to a prepaid account, billing to an open account, billing to a credit card, and the like. For example, a requesting end user system 124 may request a specific content object. Content originator 106 and/or content delivery network 110 may validate eligibility of user system(s) 124 to receive the content and may grant a digital token that is good for a certain period of time and authorizes release of a specific content object to an IP address 129 associated with the token.

Before a requested content object is transmitted to a user, a watermark engine 122 adds information that is associated with the end user 128 and/or end user system 124, to the content object itself. Thus, different end users and/or end user systems that request a given content object receive different, uniquely watermarked content objects in response to their respective requests. FIG. 1 and FIG. 2 show watermark engines 122 within CDN 110, but a watermark engine could also be implemented within content database 102. Watermark engines 122 add identifying information as error information, that is, the information is added as an uncorrected set of digital bits after the normal transcoding process, without being handled through transcoder codec 116 or codecs 134 of CDN 110. The error information is referred to herein as a "digital watermark." The reason for adding error information as the digital watermark is that such information is partially or entirely correctable before final display of the information, as discussed below, such that the content object as presented to the end user is substantially or completely identical to the original content object. The reason for adding the digital watermark after transcoding is that a typical transcoder codec would detect the digital watermark as "errors" and assume that the errors need to be "corrected," which would erase and thus defeat the purpose of the digital watermark. In other embodiments, a transcoder codec 116 could be built or programmed to ignore errors such that the digital watermark could be added within content originator 106. Or, codecs 116 and/or 134 could be built as custom, combined transcoder codecs and watermark engines that perform transcoding and error correction first, and subsequently embed a digital watermark. Implementations that perform the digital watermarking within content originator 106 may, however, involve longer latency in responding to end user requests than implementations that perform the watermarking at the network "edge" (e.g., within POPs 120).

The identifying information may include one or more of a digital token, information of the identity of an end user 128, an account or credit card number of end user 128, an IP address 129 of the requesting end user system 124, browser type and version of the end user system 124, and/or other information. Furthermore, any of the information could be reduced to a code that is associated with the end user 128, or the end user system 124, in a look-up table. For example, end user 128-2 may log into a website using end user system 124-2. The website is hosted by a server that is part of, affiliated with or controlled by content originator 106 and/or CDN 110. The hosting server generates and/or updates a record that includes information associated with end user 128-2 and/or end user system 124-2. When end user 128-2 requests a content object, the record may include, for example, the identity of the content object, the time of the request, the time at which the request was fulfilled, etc. The record may form part of a table that can include identifying information in the form of a reference number, a random bit stream or other code that can be used thereafter as a key to retrieve any or all of the information associated with the record. For example, the table may be a look-up table and may be stored in storage 140. The reference number, random bit stream or code enables look-up of the rest of the information in the record. The table may be shared with other POPs 120 of CDN 110; in particular, the table may be accessible to a function that can check a copy of a content object retrieved from the Internet to determine if the copy was digitally watermarked, and if so, what end user and/or end user system it was identified with (see FIG. 4).

There are many possible modalities for adding a digital watermark as error information to content objects, with or without degrading quality of the content object from a user perspective. For example, a digital watermark can be added as error information in color pixel data, luminance pixel data, motion vector data, audio track data, key frame metadata, macroblock ordering, slice ordering or quantization factors. Certain formats of content object storage may include other types of data that is normally subject to having errors therein corrected by error correcting software and/or hardware, and all such types of data may be altered with error information to provide a digital watermark. Additionally, error information that exceeds the capability of error correcting software and/or hardware may be utilized; in such cases, the quality of the content object as displayed to the user may degrade because at least some of the error information remains as bit errors even after other parts of the error information are corrected. However, in many cases, error information that degrades quality can still be added without apparent degradation to a human user, by careful choice of location of the error information within a content object, as discussed further below.

In an embodiment, the identifying information is encrypted by any of a number of known methods, before being added to the content object. The specific encryption method may be kept confidential to decrease the likelihood of detection and/or removal of the digital watermark from the content object by the user, also so that the entity that adds the digital watermark can be the sole entity that can successfully detect it. In another embodiment, the identifying information may not be encrypted but may be a code that refers to an entry in a look-up table that is not publicly accessible. Such codes may provide the benefit of being both compact in size and meaningless to the end user, who does not have access to the look-up table.

After the content object is received by the user, when the content object is played, a codec 127 of the end user system 124 may prepare the content object for display, performing error correction such that the bit errors that form the digital watermark are removed, making the presence of the watermark undetectable by the user. Codec 127 is generally not accessible to the user, and the content object that is processed for display is generally not retained. This makes it difficult for the user to know that the digital watermark had ever been in place, let alone provide sufficient information to the user to intercept a copy of the content object with the watermark removed, or capture the error information for analysis. Even in cases where the bit errors that form the watermark exceed the capacity of the user's codec to correct, the content object may merely appear to be of low quality or "noisy." However, if the content object is stored as received from the Internet and is later retransmitted or copied, the watermark will remain embedded in the content object and will be detectable to a system that has knowledge of the digital watermarking format.

The use of bit error information in the content object itself provides a variety of opportunities to implement a digital watermark in ways that are nearly impossible to defeat by a user who lacks information about the specific methods used. For example, the digital watermark may be encoded into a content object at multiple locations (e.g., multiple times within the video and/or multiple places within images) such that even if a user could find or work around a single such watermark, other locations would still include the watermark. Also, digital watermark information can provide not only the identifying information of the user, but information about location of further watermarks. For example, one or more locations within a content object may include a location key that identifies other locations within the content object where the identifying information occurs. In other examples, one or more locations within a content object identify information such as an encryption algorithm, an encryption key, or a reference to an external look-up table that is inaccessible to the end user and can cross reference identifying information in the digital watermark with user identity, end user system identity and/or other information.

In embodiments, a computer can compare a known unaltered copy of a content object to a digitally watermarked copy to extract the bit errors corresponding to the watermark. As noted above, these bit errors may represent identifying information directly, may represent the identifying information based on a look-up table, or may represent an encrypted version of the identifying information. A digital watermark can also be detected in a video file by a decoding computer running software that has information of how and where the watermark is embedded in the content object. For example, the decoding computer may have information about one or more locations within the content object where the digital watermark is embedded, and can directly extract the identifying information from the specific location(s), as opposed to comparing the entire content object with a known unaltered copy. The decoding computer may also have information of an algorithm that provides a location or encryption key, such that the location or encryption key is first obtained from the content object, after which the identifying information is extracted from the location(s) indicated by the location key and/or decrypted utilizing the encryption key.

Therefore when a copy of the video file is found and provided to the computer that has the information of how and where the watermark is embedded, the computer can regenerate the original identifying information, which can then be utilized for investigation, legal and/or law enforcement purposes.

In embodiments, multiple digital watermarks are advantageously provided within a content object. The multiple digital watermarks may be identical to, similar to, or different from each other, and may operate independently or synergistically. For example, in a first approach, a series of digital watermarks within a content object include (or point to) the same identifying information and operate in the same mode, providing protection for multiple locations within the content object, so that the content object may remain protected if a user cuts out certain sections of the content object. That is, as long as one of the digital watermarks remains in the content object after other portions are cut out, the content object remains traceable to the user through the remaining digital watermark. However, if a user becomes aware of the specific digital watermark technique in use and can detect specific instances, the user may be able to cut out or corrupt all instances of the digital watermarks in the content object, and create a copy that does not include any of them. In a second approach, a series of digital watermarks operates on differing principles (e.g., some based on color information, some based on luminance information, some based on audio information) and are spread throughout a content object. In a third approach, a digital watermark as described above may be paired with a visible watermark (that is, information that is present before transcoding and that remains, e.g., is visible, throughout any transcoding processes and/or error correction). Although use of multiple modes of digital watermarking may require more development effort and more processing to implement, the second and/or third approaches discussed may prevent certain users from detecting and circumventing the digital watermarking because the certain users may defeat one or more of, but not all of, the watermarking techniques. Content objects that were known to be digitally watermarked in multiple modes but are later detected with one or more modes defeated may provide potent legal evidence of an intent to actively circumvent the watermarking scheme.

Implementation of digital watermarking may be limited by consideration of how much error information can be introduced without degrading user experience when a content object is displayed in a normal fashion. For example, a digital watermark that is added to a portion of a content object that normally displays as uniformly bright or uniformly dark may be limited in terms of how much error information could be tolerated in a luminance channel, because the human eye could easily pick out distracting variations in brightness. However, a portion of a content object that displays as uniformly dark may be an ideal place to vary color information, because the human eye may not easily see color variations in the dark area. Conversely, certain visual (or audio) patterns are intrinsically chaotic such that minor variations therein may not be seen easily. For example, visually "busy" material such as surf, fire, explosions and crowds seen at a distance may provide backgrounds against which such minor variations would be very difficult to detect. Similarly, noisy audio information such as crowd noise, motor noise, explosions, surf, waterfalls, and the like may provide audio backgrounds against which minor variations in sound due to digital watermarking may be imperceptible to a human.

Figure 3:
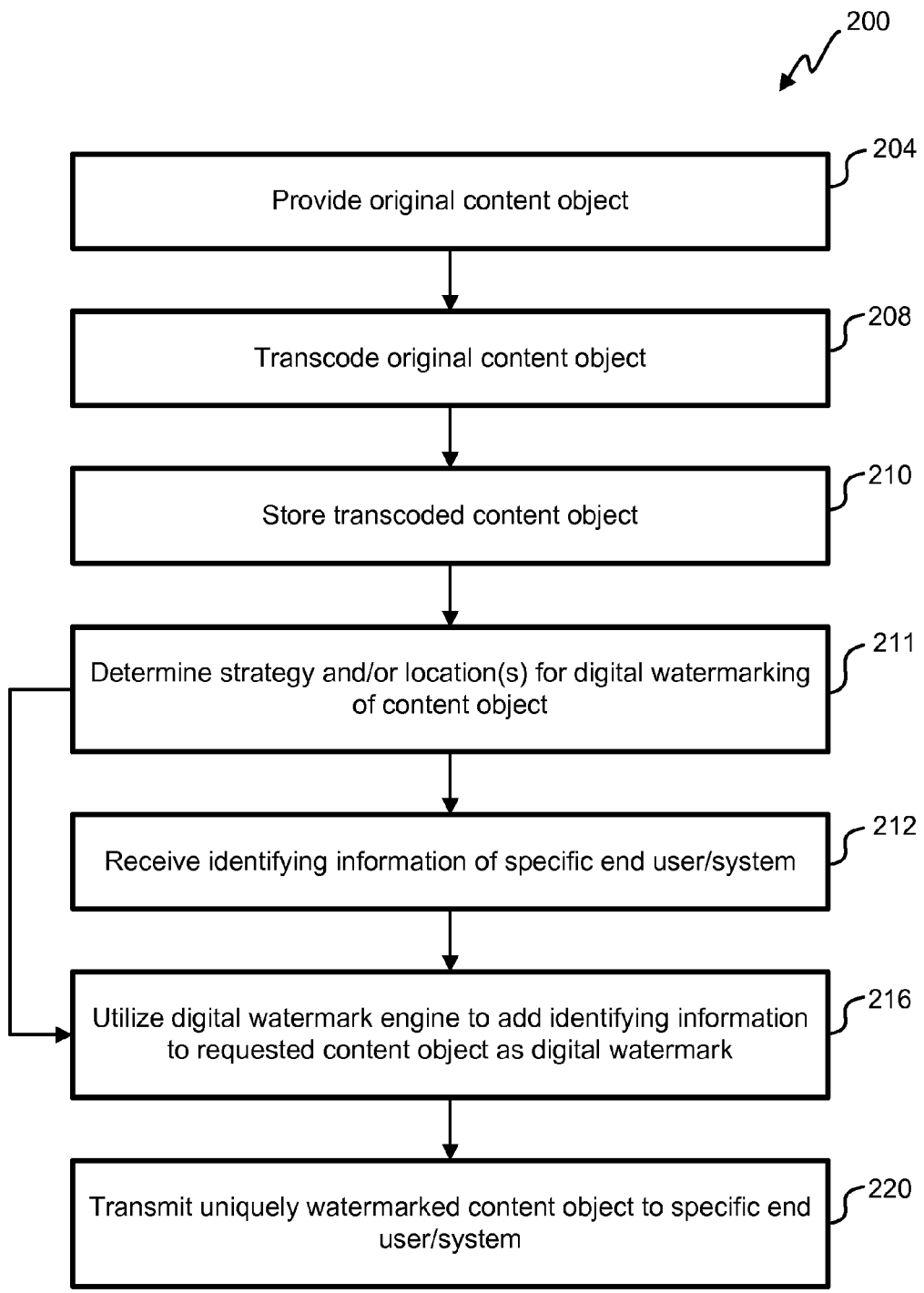
FIG. 3 is a flowchart of a method of uniquely watermarking a content object according to end user identity, according to an embodiment.

FIG. 3 is a flowchart of a method 200 of uniquely watermarking a content object according to end user identity, according to an embodiment. Method 200 begins with a step 204 that provides an original content object. An example of step 204 is content provider 108, FIG. 1, providing an original content object. Step 208 transcodes the content object into a format that is compatible with transmission to any of a number of end user systems that may request the content object. An example of step 208 is codec 116, FIG. 1, or any of codecs 134, FIG. 2, transcoding the content object. Step 210 stores the transcoded content object in a database that is accessible by one or more points of presence (POPs) of a content delivery network. Examples of step 210 are content database 102, FIG. 1, receiving the transcoded content object from codec 116 and storing it, or storage 140, FIG. 2, receiving the transcoded content object from any of codecs 134, FIG. 2, and storing it. Content database 102 is accessible by one or more POPs 120 of content delivery network 110, FIG. 1, and storage 140 is at least accessible by POP 120-1 (and may be accessible to other POPs through connections among POPs, as discussed above).

Step 211 determines a strategy and/or location(s) for digitally watermarking the content object. For example, in an embodiment, one or more humans (e.g., representatives of the content originator and/or the CDN) may review the content object and identify places where error information might be well hidden within the content object, for example in dark spatial regions of video frames, or visually or audibly chaotic regions, as discussed above. In an alternative embodiment, a computer could review the content object using objective criteria for dark or chaotic content. In a still further alternative embodiment, the strategy could be to ignore the content of the content object and simply place bit errors within it at a rate that is low enough to be fully corrected by error correction software. Step 211 need not necessarily be performed at the point shown in method 200, that is, step 211 could be deferred until an actual request for a content object is received, and could be performed as a part of step 216.

In step 212, one of the one or more POPs of a content delivery network that has access to the transcoded content object receives identifying information associated with a content object request from a specific end user and/or end user system. An example of step 212 is any of POPs 120, FIG. 1, receiving identifying information of an end user system 124 and/or an end user 128. As noted above, the identifying information may be a user name, an account or credit card number, an IP address of an end user system, a digital token that authorizes download of a content object to an end user system, a code that is associated with identifying information through a look-up table, and/or other forms of information that are particular to an end user system and/or an end user.

Step 216 of method 200 utilizes a digital watermark engine to add the identifying information from step 212 to a requested content object as a digital watermark. An example of step 216 is any of watermark engines 122, FIG. 1, including watermark engine 122-1, FIG. 2, adding identifying information to a transcoded content object received from content database 102, FIG. 1, or storage 140, FIG. 2. As noted above, the identifying information may be added as received in step 212, or may be encrypted. The digital watermark is added as an uncorrected set of digital bits after the normal transcoding process, without being handled through a transcoder codec or other codec that would correct bit errors. The digital watermark can be added as error information in color pixel data, luminance pixel data, motion vector data, audio track data, key frame metadata, macroblock ordering, slice ordering or quantization factors. Step 220 transmits the uniquely watermarked content object to the specific end user and/or end user system that requested it. An example of step 220 is content delivery network 110 transmitting the uniquely watermarked content object over internet 104 to a requesting end user system 124 for display to an end user 128.

As suggested above, content providers may have significant incentive to identify end users and/or end user systems that store, transmit or rebroadcast content objects without authorization to do so. Accordingly, a content delivery network can provide a business service to content providers by implementing digital watermarking and/or extracting identifying information from suspected illicit copies of content objects. For example, a content delivery network may form an agreement with a content provider under which the content delivery network is compensated for each of the content provider's works that is transmitted to a third party with a digital watermark, perhaps at a rate of cents or less than one cent per watermarked content object. The content delivery network may also form agreements with the content provider under which the content delivery network is further compensated for analysis of a suspected illicit copy. For example, the content delivery network might receive one rate of compensation, perhaps a few dollars, to attempt analysis of a copy that does not identify an end user or end user system (e.g., the copy was not digitally watermarked, or the digital watermark cannot be decoded) and a higher rate of compensation, perhaps tens, hundreds or thousands of dollars, when the analysis positively identifies an end user or end user system.

Figure 4:
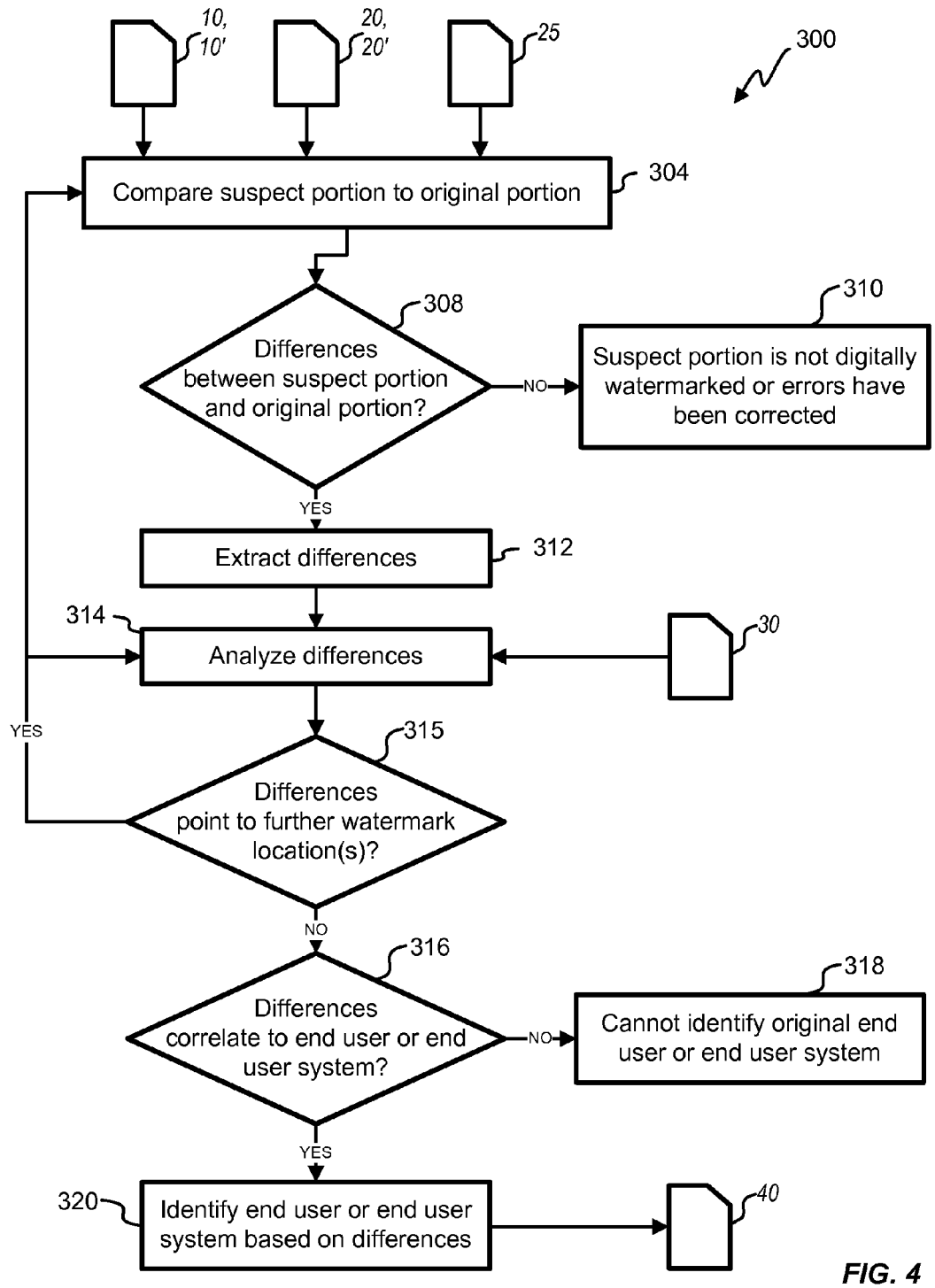
FIG. 4 is a flowchart of a method of analyzing a suspect content object that may be uniquely watermarked according to end user identity, according to an embodiment.

FIG. 4 is a flowchart of a method 300 of analyzing a suspect content object that may be uniquely watermarked according to end user identity, according to an embodiment. Method 300 may be performed, for example, on a computer configured in software to perform each of the steps described below. Method 300 begins with a step 304 that compares a portion 10 of a suspect content object to a portion 20 of an original, corresponding content object. Portions 10 and 20 may be of any size and may represent one or more fragments of the original content object, or the entire, original content object. An example of step 304 is subtracting a bit stream of the suspect content object portion from a corresponding bit stream of the original, corresponding content object portion. In this way, step 304 may generate at least a difference bit stream the same size as the content object portion, wherein, for example, a zero bit at a given location indicates that the original and suspect bit streams have the same value at that location, and a one bit indicates a difference between the original and suspect bit streams at that location (of course, the significance of zeros and ones in this example could be reversed). Alternatively, step 304 can take additional input 25; input 25 may be for example a list of specific locations within the content object portion that are digitally watermarked, so that method 300 can analyze only those corresponding locations of the suspect content object portion for differences; input 25 can also be stored portions or all of a digitally watermarked content object as released to a particular end user.

Step 308 is a decision step that analyzes whether any differences at all were found in step 304. If not, method 300 terminates in step 310, indicating that the suspect content object either was not digitally watermarked in the first place, or the errors forming the watermark have been corrected. If differences are found in step 308, method 300 progresses to an optional step 312 where the differences are extracted. An example of step 312 is cutting down a difference bit stream that is as long as the original content object, to just the contents of the difference bit stream at specified locations. Another example of step 312 is utilizing a first section of differences that is identified by searching the difference bit stream for nonzero bits, analyzing the section to determine further locations of differences, and extracting the differences at those locations. Alternatively, if the specific locations of differences forming the watermark information are known in advance (e.g., the locations are included in a list forming input 25), step 312 may be eliminated because the difference information could be extracted at step 304.

Once difference information is extracted, step 314 analyzes the difference information to determines whether the difference information is in fact digital watermark information, and whether the difference information is random, correlates to a particular end user or end user system, and/or points to further locations in the content object portion. For example, random bit errors that are either dispersed throughout the suspect content object or clustered within certain locations may simply be due to transmission errors or degradation by other means (e.g., dirt or scratching on a copy of the content object that was written to a compact disc at some point). Or, when an encoding algorithm for the information relies on a large number of bits or multiple locations within a content object to encode the end user or end user system's identity, loss of some of the corresponding bits may render it impossible to identify the specific end user or system. Step 314 may utilize optional input 30 such as encryption keys or other information to analyze the difference information.

A first decision step 315 utilizes results of step 314 to decide whether any detected differences point to further watermark locations or decoding methods. For example, results of step 314 may indicate additional locations of digital watermark information that were not known at the first execution of step 304. If so, method 300 returns to step 304 to compare additional locations within suspect content object portion 10 (or within an additional suspect content object portion 10') to the corresponding portions of the original content object (or an additional, original portion 20'). Or, results of step 314 may point to an additional decoding method that can be utilized with the existing differences extracted in step 312, in which case method 300 returns to step 314 to utilize the indicated method.

A further decision step 316 determines whether the results of step 314 correlate to a specific end user or end user system. If not, decision step 316 directs method 300 to terminate in step 318, with the conclusion that the suspect content object was in fact different from the original, perhaps an infringing copy, but that the end user or end user system cannot be identified. When step 316 does correlate the analyzed differences to a specific end user or end user system, method 300 terminates in step 320, and provides identification of the specific end user or end user system indicated by the watermark as output 40.

Various subsets of method 300 may be repeated to analyze multiple locations within a content object, in order to increase confidence of identifying a specific end user or end user system. That is, a single location could misidentify a specific end user or end user system due to chance errors, but identifying multiple locations that point to the same end user or end user system would significantly decrease the probability of misidentification. Thus, in embodiments, output 40 can include multiple results, each from a different location within suspect portion 10, with multiple positive identifications providing increasing confidence that a specific end user or end user system was responsible for originating the suspect portion 10.

Figure 5:
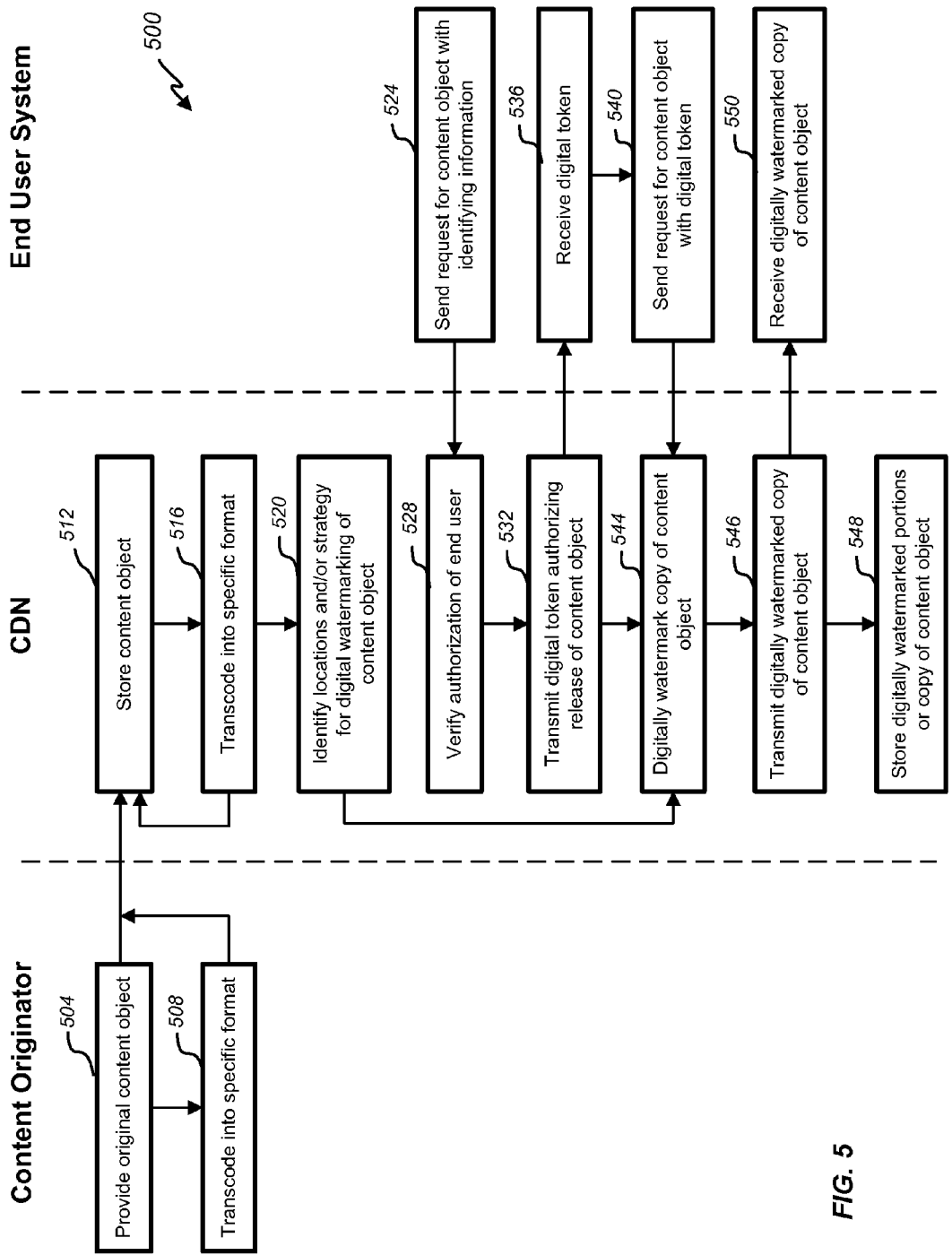
FIG. 5 is a swim diagram that illustrates a method of uniquely watermarking a content object according to end user identity in terms of interactions among a content originator, a CDN and an end user system.

FIG. 5 is a swim diagram that illustrates a method 500 of uniquely watermarking a content object according to end user identity, in terms of interactions among a content originator, a CDN and an end user system. In a first step 504, the content originator provides an original content object for storage in the CDN and eventual distribution to end users. The original content object may be transmitted directly to the CDN, or in an optional step 508, it may be transcoded into a specific format before being transmitted to the CDN; step 508 may be repeated as needed so that the CDN receives copies of the content object in any number of desired formats. In step 512, the CDN stores the content object. In an optional step 516, the content object is transcoded into a different format which is again stored in step 512. Like step 508, steps 516 and 512 may be reiterated as needed until copies of the content object exist in all of the formats that are desired. In an optional step 520, locations and/or strategy for digital watermarking are determined. Such determination may be done by humans or by computer, as discussed in connection with step 211, FIG. 3. Step 520 need not necessarily be done before an end user request has been placed for the content object; that is, step 520 may be combined with step 528, as described below.

In step 524, an end user sends a request for the content object, which includes at least an IP address of the end user. The IP address may suffice as identifying information for security and/or accounting purposes, or may be accompanied by additional information from the end user system, such as end user account identification, a credit card number or the like. The request arrives at the CDN. In step 528, the CDN verifies authorization of the user (if the user is not authorized, method 500 simply ends). In step 532, the CDN transmits a digital token authorizing release of the content object to the IP address provided in step 524. The CDN may optionally begin step 544 at this point, that is, the CDN may assume that the content object will soon be requested with the proper digital token authorizing its release, and may begin digitally watermarking a copy of the content object, to minimize delay in its subsequent release.

In step 540, the end user system sends a second request for the content object, this time including the digital token that authorizes release of the content object. Steps 536 and 540 may occur automatically and quickly at the end user system such that the end user herself does not perceive their execution, that is, the actions of the end user system and the CDN seem like a single request (step 524) and response (step 550, below). In step 544, the CDN digitally watermarks a copy of the content object; step 544 either follows the strategy and/or digital watermarking locations previously identified in step 520, or such locations and strategy are now identified and implemented. Step 546 transmits the digitally watermarked copy of the content object to the end user system, and in step 550 the end user system receives the digitally watermarked copy. An optional step 548 stores digitally watermarked portions of the content object, or the entire digitally watermarked object, for possible future use in decoding a suspect content object, as discussed above.

A number of variations and modifications of the disclosed embodiments will become evident to one skilled in the art upon reading and appreciating the present disclosure, and can also be used. Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A machine-implementable method for uniquely watermarking content objects according to end user identity, comprising:
   transcoding an original content object to form a transcoded content object, the transcoded content object having a format that is compatible with:
      transmission to an end user system, and
      display by the end user system to an end user;
   storing the transcoded content object in a storage medium that is accessible by one or more points of presence (POPs) of a content delivery network;
   receiving, at one of the one or more POPs of the content delivery network, a first request and a second request for the transcoded content object from first and second end user systems respectively, wherein
      the first request for the transcoded content object conveys first identifying information that is associated with at least one of:
         identity of the first end user system and
         identity of a first end user of the first end user system;
      the second request for the transcoded content object conveys second identifying information that is associated with at least one of:
         identity of the second end user system and
         identity of a second end user of the second end user system;
      the first and second end users are not the same, and
      the first and second end user systems are not the same;
   adding, by the one of the one or more POPs of the content delivery network, first and second uncorrected digital watermark information to the transcoded content object to form respective first and second uniquely watermarked content objects, wherein:
      the first and the second uncorrected digital watermark information are different from one another, and correspond to the first and second identifying information respectively, and
      both the first and the second uncorrected digital watermark information are correctable by error correction capability of the respective end user systems such that the respective first and second end user systems display content that is indistinguishable by the first and second end users from the transcoded content object; and
   transmitting the first and second uniquely watermarked content objects from the one of the one or more POPs of the content delivery network to the first and second end user systems respectively.

2. The machine-implementable method for uniquely watermarking a content object according to end user identity of claim 1, wherein the first identifying information is a digital token that authorizes release of the first uniquely watermarked content object to the first end user system.

3. The machine-implementable method for uniquely watermarking a content object according to end user identity of claim 1, wherein the first uncorrected digital watermark information is correctable by error correction capability of the first end user system to create a version of the content object that is identical to the transcoded content object without the first uncorrected digital watermark information.

4. The machine-implementable method for uniquely watermarking a content object according to end user identity of claim 1, wherein the first uncorrected digital watermark information is a code associated with the first identifying information in a look-up table, and further comprising:
   adding, by the one of the one or more POPs of the content delivery network, the code and the first identifying information to the look-up table.

5. The machine-implementable method for uniquely watermarking a content object according to end user identity of claim 4, wherein the code is a random bit stream.

6. The machine-implementable method for uniquely watermarking a content object according to end user identity of claim 1, wherein the first identifying information is associated with identity of one or both of the first end user system and the first end user.

7. The machine-implementable method for uniquely watermarking a content object according to end user identity of claim 1, wherein the first identifying information is encrypted to form the first uncorrected digital watermark information.

8. The machine-implementable method for uniquely watermarking a content object according to end user identity of claim 1, wherein the first uncorrected digital watermark information is added as error information to one or more of color pixel data, luminance pixel data, motion vector data, audio track data, key frame metadata, macroblock ordering, slice ordering or quantization factors.

9. The machine-implementable method for uniquely watermarking a content object according to end user identity of claim 8, wherein the content object is a video file, and the first uncorrected digital watermark information is added as error information to pixel data within a dark area of an image within the video file.

10. The machine-implementable method for uniquely watermarking a content object according to end user identity of claim 8, wherein the content object is a video file, and the first uncorrected digital watermark information is added within an area of an image within the video file that corresponds to one of surf, fire, an explosion and a crowd.

11. The machine-implementable method for uniquely watermarking a content object according to end user identity of claim 1, wherein the first uncorrected digital watermark information is added to the content object at a plurality of locations within the content object.

12. The machine-implementable method for uniquely watermarking a content object according to end user identity of claim 11, wherein the first uncorrected digital watermark information in one of the plurality of locations within the content object can be used to identify others of the plurality of locations within the content object where the first identifying information is added.

13. The machine-implementable method for uniquely watermarking a content object according to end user identity of claim 11, wherein the first uncorrected digital watermark information is encoded using two or more differing modalities selected from the group consisting of color pixel data, luminance pixel data, motion vector data, audio track data, key frame metadata, macroblock ordering, slice ordering and quantization factors, at two or more of the plurality of locations.

14. One or more machine-readable media having machine-executable instructions configured to perform the machine-implementable method for uniquely watermarking a content object according to end user identity of claim 1.

15. A machine adapted to perform the machine-implementable method for uniquely watermarking a content object according to end user identity of claim 1.

16. A system for uniquely watermarking an original content object according to end user identity, comprising:
    storage that is accessible by one or more points of presence (POPs) of a content delivery network, and stores the content object as a transcoded content object in a format that is compatible with:
        transmission to an end user system, and
        display by the end user system to an end user;
    an edge server, within one of the one or more POPs, that is configured to receive a request for the transcoded content object from the end user system, wherein the request for the transcoded content object conveys identifying information, the identifying information being associated with at least one of:
        identity of the end user system, and
        identity of the end user; and
    a watermark engine, within the one of the one or more POPs, that adds uncorrected digital watermark information to the transcoded content object to form a uniquely watermarked content object, wherein:
        the uncorrected digital watermark information corresponds to the identifying information,
        the uncorrected digital watermark information is correctable by error correction capability of the end user system such that the end user system displays a version of the content object that is indistinguishable by the end user from the original content object, and
        the uniquely watermarked content object is transmitted to the end user system.

17. The system for uniquely watermarking an original content object according to end user identity of claim 16, wherein the edge server acts as the watermark engine.

18. The system for uniquely watermarking an original content object according to end user identity of claim 16, further comprising a codec within the one of the one or more POPs, wherein the system receives the original content object, and the codec transcodes the content object into the format to form the transcoded content object.

19. The system for uniquely watermarking an original content object according to end user identity of claim 16, wherein the watermark engine adds the uncorrected digital watermark information to the transcoded content object at a plurality of locations to form the uniquely watermarked content object.

20. The system for uniquely watermarking an original content object according to end user identity of claim 19, wherein the uncorrected digital watermark information comprises different information added to at least two of the plurality of locations.

* * * * *